Dec. 29, 1964  C. BRAMMING  3,163,307
VACUUM BOTTLE HAVING RESILIENTLY COMPRESSIBLE GASKET
Filed Nov. 14, 1962  3 Sheets-Sheet 1
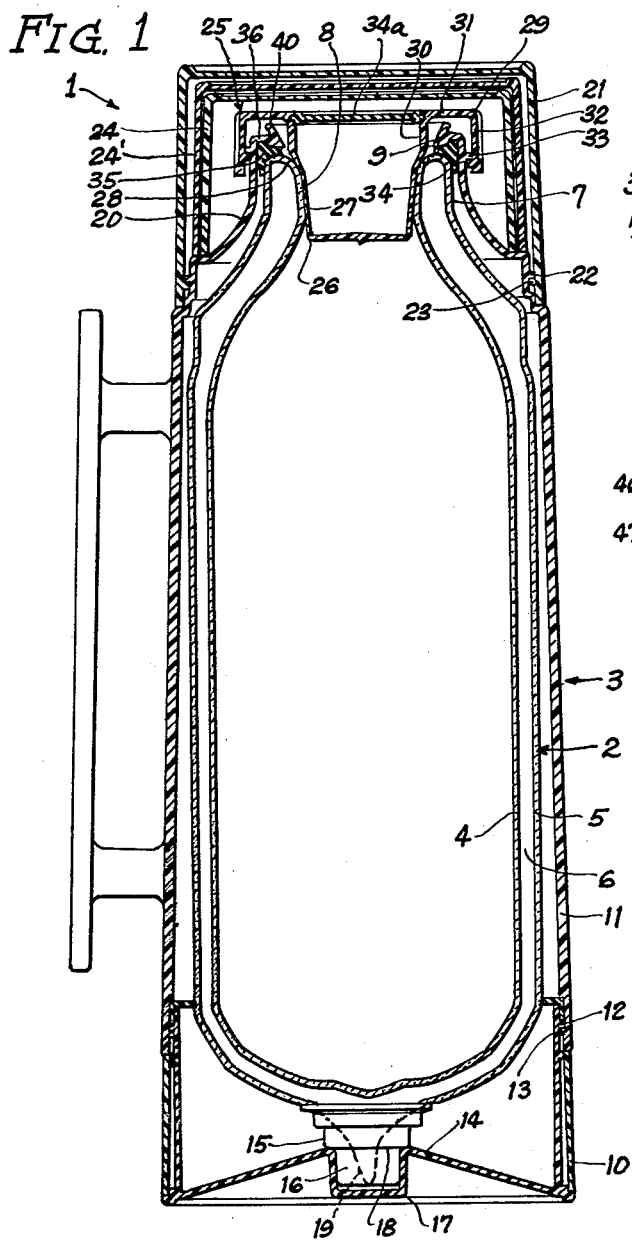
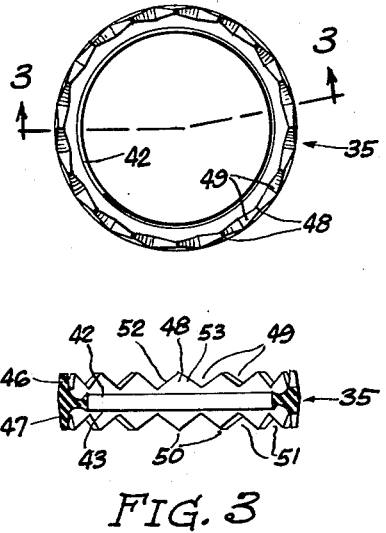
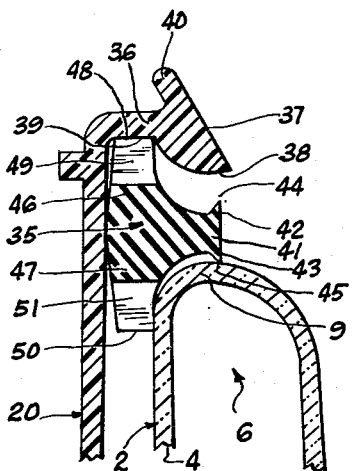
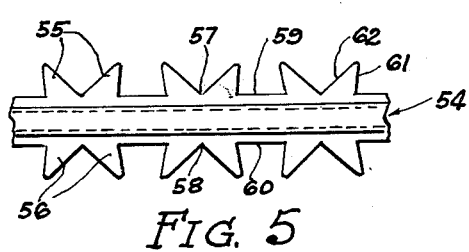
INVENTOR.
Carl Bramming
BY
Ooms, McDougall and Hersh
Att'ys Dec. 29, 1964     C. BRAMMING     3,163,307
VACUUM BOTTLE HAVING RESILIENTLY COMPRESSIBLE GASKET
Filed Nov. 14, 1962     3 Sheets-Sheet 3

INVENTOR.
Carl Bramming
BY
Ooms, McDougall and Hersh
Att'ys

United States Patent Office 3,163,307
Patented Dec. 29, 1964

3,163,307
VACUUM BOTTLE HAVING RESILIENTLY
COMPRESSIBLE GASKET
Carl Bramming, Palm Desert, Calif., assignor to Aladdin Industries, Incorporated, Nashville, Tenn., a corporation of Illinois
Filed Nov. 14, 1962, Ser. No. 237,694
6 Claims. (Cl. 215—13)

This invention relates to vacuum bottles of the general type in which a vacuum insulated receptacle is contained within a protective jacket.

One object of the present invention is to provide a new and improved vacuum bottle in which a resiliently compressible gasket or sealing ring is disposed between the upper end of the vacuum insulated receptacle and the upper end of the jacket to press the receptacle downwardly and prevent movement of the receptacle within the jacket despite minor dimensional variations in the length of the receptacle.

A further object is to provide a new and improved vacuum bottle of the foregoing character in which the gasket is formed with a series of serrations having notches therebetween to render said gasket resiliently compressible.

Another object is to provide a new and improved vacuum bottle of the foregoing character in which the jacket is provided with a bottom member for unyieldingly supporting the receptacle so as to prevent the receptacle from being moved downwardly within the jacket by the pressure of a closure inserted into the mouth of the receptacle and screwed onto the upper end of the jacket.

A further object is to provide a new and improved vacuum bottle in which the resilient compressibility of the gasket and the unyielding support of the receptacle prevent any disturbance of the seal between the jacket and the receptacle despite the downward pressure of a closure on the receptacle.

Further objects and advantages of the present invention will appear from the following description, taken with the accompanying drawings, in which:

FIG. 1 is a longitudinal section of a vacuum bottle to be described as an illustrative embodiment of the present invention.

FIG. 2 is a plan view of a resiliently compressible gasket employed in the vacuum bottle.

FIG. 3 is a section through the gasket, generally along a line 3—3 in FIG. 2.

FIG. 4 is an enlarged section showing the initial engagement between the gasket, the upper end of the vacuum insulated receptacle, and the upper end of the protective jacket.

FIG. 5 is a fragmentary view similar to FIG. 3 but showing a modified gasket.

Figure 6:
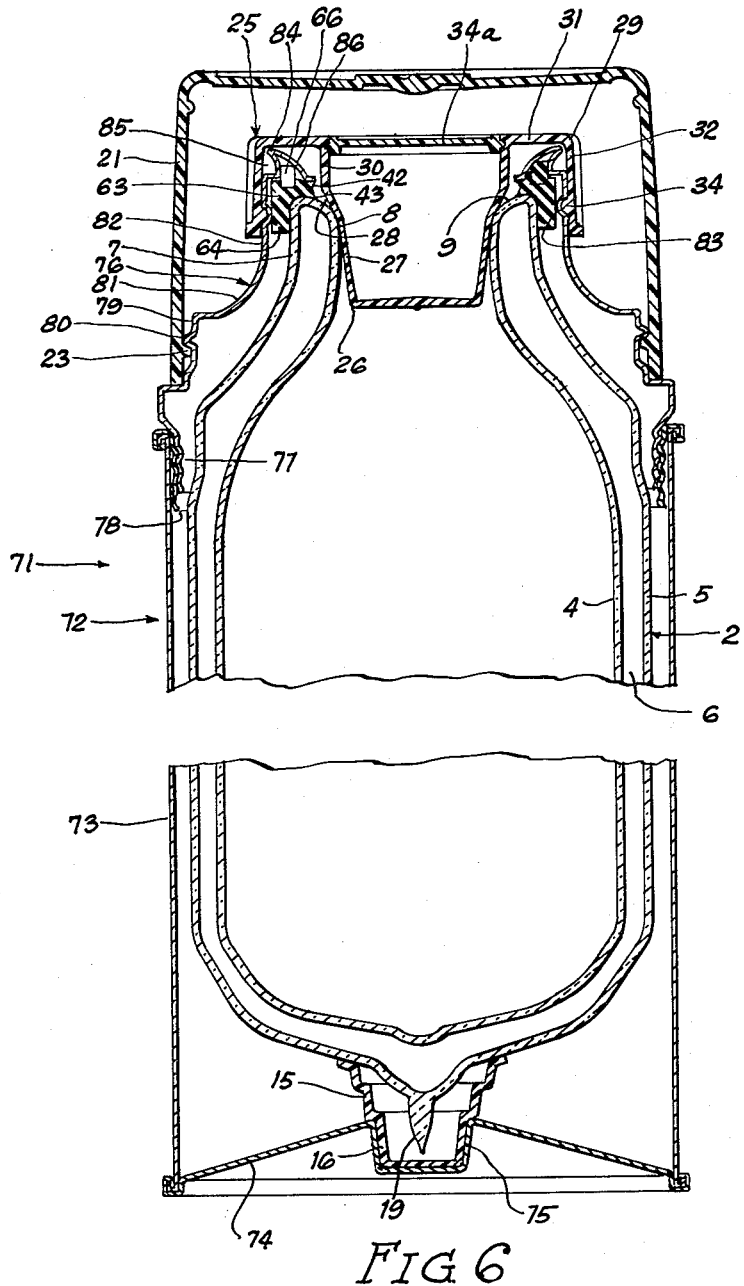
FIG. 6 is a longitudinal section of another vacuum bottle utilizing another modified gasket.
Figure 7:
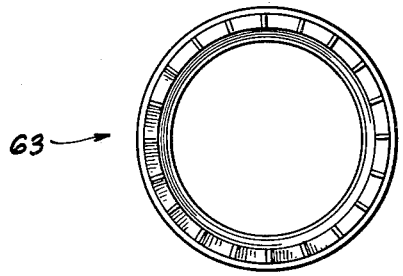
FIG. 7 is a plan view of the modified gasket of FIG. 6.
Figure 8:
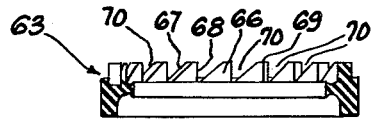
FIG. 8 is a sectional view of the gasket of FIG. 6.
Figure 9:
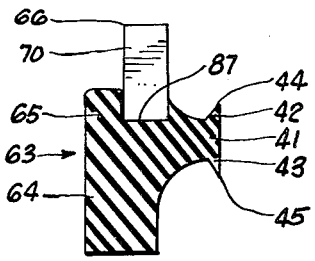
FIG. 9 is an enlarged cross section of the gasket of FIG. 6.

It will be seen that FIG. 1 illustrates a vacuum bottle 1 of the type having a vacuum insulated filler or receptacle 2 which is contained within a protective jacket or housing 3. The filler 2 is normally made of glass, while the jacket 3 may be made of metal, various plastics, or other suitable materials. The illustrated jacket 3 is made of plastic. The filler 2 is of the type having inner and outer walls 4 and 5 with an evacuated space 6 therebetween. At its upper end, the filler 2 has a neck portion 7 which is more or less reduced in diameter. A mouth 8 is formed in the upper end of the receptacle 2. It will be seen that the upper end of the receptacle 2 is in the form of a rounded wall portion 9 which extends between the inner and outer walls 4 and 5.

As shown, the protective jacket 3 has a generally cup-shaped bottom portion 10 which is disengageably mounted on the lower end of a generally cylindrical side wall portion 11. Mating screw threads 12 and 13 may be formed on the bottom and side portions 10 and 11 so that the jacket can be assembled by screwing the bottom portion 10 into the side wall portion 11. Likewise, the jacket may be disassembled when it is necessary to replace the filler 2 due to breakage or damage.

The illustrated jacket 3 has a lower wall member 14 which is adapted to support the lower end of the filler 2 in a firm, substantially unyielding manner. In this case, the filler 2 is fitted with a tubulation protector 15 having a reduced lower portion 16 adapted to be received within a cup-shaped retainer 17 formed integrally with the central portion of the bottom wall 14. The tubulation protector 15 has a downwardly facing shoulder 18 adapted to engage the bottom wall 14 around the cup-shaped retainer 17. The tubulation protector 15 may be made of plastic, metal, or other suitable material and may be cemented to the lower end of the filler 2. It will be understood that the protector 15 encloses the fragile tubulation or tip 19 on the lower end of the vacuum insulated filler 2. The tubulation 19 constitutes the sealed off tube which was used in evacuating the space 6 between the inner and outer walls 4 and 5 of the filler during the process of manufacture.

As shown, the protective jacket 3 has an upper or collar portion 20 which tapers upwardly in diameter and surrounds the neck portion 7 of the filler 2. While the collar portion 20 is often removable, it is formed integrally with the side wall portion 11 in this instance, inasmuch as the filer 2 may be removed by unscrewing the bottom member 10 from the side wall portion 11. An inverted cup 21 may be disengageably mounted on the lower end of the collar portion 20 to protect the upper end of the filler and to provide a drinking cup when removed from the collar portion 20. Mating screw threads 22 and 23 may be formed on the collar 20 and the cup 21. Additional drinking cups 24 and 24' may be nested within the cup 21, if desired.

In this case, the vacuum bottle is equipped with a closure 25 comprising a stopper 26 which is adapted to be inserted into the mouth 8 of the filler 2. In this case, the stopper 26 is hollow and cup-shaped in form and is provided with a thin flexible downwardly tapering side wall 27 adapted to form a seal in the mouth 8 of the filler 2. The stopper 26 also has an outwardly flaring annular shoulder 28 at the upper end of the thin side wall 27 to form a secondary seal with the upper end of the filler 2.

In this case, the closure 25 has a mounting ring 29 adapted to be screwed onto the upper portion of the collar 20 so as to press the stopper 26 downwardly into the mouth of the filler. The mounting ring 29 has a cross section which is generally in the form of an inverted U. Thus, the ring 29 comprises an inner cylindrical flange 30 projecting upwardly from the shoulder 28, a generally horizontal flange 31 projecting outwardly from the upper end of the flange 30, and an outer depending flange 32 extending downwardly from the outer edge of the flange 31. Mating screw threads 33 and 34 may be formed on the collar 20 and the depending flange 32. In this case, a closure disk 34a is snapped into the upper end of the inner cylindrical flange 30.

In accordance with the present invention, the vacuum bottle is equipped with a resiliently compressible gasket or sealing ring 35 which is disposed between the upper end of the filler 2 and an inwardly projecting annular flange 36 on the collar portion 20 of the jacket 3. The gasket 35 provides a seal between the filler 2 and the flange 36 so as to prevent leakage of liquids into the space between the filler and the jacket. At the same time, the gasket 35 is resiliently compressible to a great extent so that it will be capable of compensating for the manufacturing variations in the length of the filler 2. It has been found that the filler is subject to variations in length in mass production, despite efforts to hold the fillers to the same length.

The illustrated flange 36 has a downwardly projecting inner portion 37 having a downwardly facing generally horizontal sealing surface 38. A downwardly facing annular groove or recess 39 extends around the downwardly projecting portion 37. In this case, an upwardly projecting outwardly flaring pouring lip 40 is formed on the flange 36 to prevent liquid from dripping or running down the outside of the collar 20 when the liquid is poured from the filler.

The gasket 35 may be made of natural rubber, synthetic rubber, or other resilient rubberlike materials. As shown, the gasket 35 has an inwardly projecting flange 41 formed with upper and lower annular sealing lips 42 and 43, both of which are thin and flexible. The upper lip 42 projects upwardly for sealing engagement with the downwardly facing surface 38 on the flange 36. Similarly, the lower lip 43 projects downwardly for sealing engagement with the rounded upper end 9 of the filler 2. It will be seen that the lips 42 and 43 taper to annular knife edges 44 and 45. The flexibility of the sealing lips 42 and 43 insures that the gasket will form a perfect seal between the filler 2 and the flange 36 despite minor variations in the length of the filler 2.

The outer portion of the gasket 35 is formed with upwardly and downwardly projecting annular flanges 46 and 47. To render the gasket 35 highly compressible, the upper flange 46 is provided with a series of serrations 48 with openings or voids 49 therebetween. Similarly, the lower flange 47 is formed with a series of serrations or teeth 50 with openings or recesses 51 therebetween. The openings 49 and 51 might assume a variety of forms while still providing for resilient compressibility of the gasket 35. As shown in FIG. 3, the serrations 48 and 50 are simply triangular in shape with equally slanted sides 52 and 53. The illustrated openings 49 and 51 are in the form of V-shaped notches. The openings in the gasket may take the form of recesses or internal voids. To increase the compressibility of the gasket, it may in some cases be made partly or entirely of sponge or foam rubber or other similar material having internal voids or cells. Preferably, the foam material should be of the monocellular type, having individual unconnected cells.

When endwise pressure is applied to the gasket 35, the upper serrations 48 are flexed and collapsed by the pressure so as to provide for a high degree of compressibility in the gasket. Such pressure is applied during the assembly of the vacuum bottle, when the bottom member 10 is screwed into the side member 11 so as to push the filler 2 upwardly against the gasket 35. FIG. 4 illustrates the initial engagement between the gasket 35, the filler 2, and the collar 20, before any pressure has been exerted to collapse or compress the gasket. FIG. 1 shows the gasket after it has been collapsed or compressed by the upward pressure of the filler. By virtue of the serrations and openings, the gasket is highly compressible and is capable of compensating for variations in the length of the filler so that the filler will be held under firm resilient pressure within the jacket, even though the filler may be unusually long or unusually short. The gasket provides an effective seal between the collar 20 and the filler 2.

It will be observed that the gasket or sealing ring 35 may be inverted, in which case the serrations 50 are compressed during the assembly of the vacuum bottle. The reversibility of the gasket facilitates the assembly of the vacuum bottle, particularly when automatic machinery is used.

As already indicated, the stopper 26 exerts a downward pressure on the filler 2 when the mounting ring 29 of the closure is screwed onto the collar 20. In certain prior vacuum bottles, this downward pressure of the closure tended to disturb the seal between the collar and the filler by causing downward movement of the filler 2 so as to produce separation between the filler and the collar. In the present construction, however, the lower end of the filler is firmly and unyieldingly supported by the lower end of the jacket so that the downward pressure of the stopper 26 does not produce any substantial downward movement of the filler relative to the flange 36 on the collar 20. Thus, there is no disturbance of the seal afforded by the gasket 35. In any event, the gasket is easily capable of compensating for any slight movement of the filler.

FIG. 5 shows a gasket 54 of modified construction having upper and lower serrations 55 and 56 which are formed in pairs with V-shaped notches 57 and 58 between the serrations of each pair. Rectangular shaped notches 59 and 60 are formed between the adjacent pairs of serrations. It will be seen that each serration has one vertical edge 61 and one slanting edge 62. Only the upper serrations need be employed, and the lower serrated portion may be made solid, if desired.

FIGS. 6–9 illustrate still another modified gasket 63 which is similar to the gasket 35 of FIGS. 1–4, except that the serrated lower flange 47 is replaced with a flange 64 which does not have any serrations or notches, but rather is continuous and unbroken around its periphery. In addition, the upper flange 46 of the gasket 35 is replaced with a flange 65 which is formed with a series of saw-toothed serrations 66. It will be seen that each of the serrations 66 has one slanting edge 67 and one vertical edge 68. Each serration has a small flat top surface 69. Notches or spaces 70 are formed between the serrations 66. As before, these serrations 66 make the gasket resiliently compressible.

As shown in FIG. 6, the modified gasket 63 is employed in a vacuum bottle 71 which is different in some respects from the vacuum bottle in FIG. 1. However, the vacuum bottle 71 utilizes essentially the same filler 2, cup 21 and closure 25 as in FIG. 1. The illustrated vacuum bottle 71 employs a protective jacket 72 which is adapted to be opened or disassembled at its upper end rather than at its lower end. As shown, the jacket 72 is made of metal, but plastics or other suitable materials may be employed. In this case, the jacket 72 comprises a generally cylindrical side wall 73 to which a bottom wall 74 is permanently secured. A well or socket member 75 is formed centrally on the bottom wall 74 to retain and support the tubulation protector 15 on the lower end of the filler 2. It will be apparent that the reduced lower portion 16 of the tubulation protector is adapted to be received in the socket member 75. The bottom wall 74 of the socket member 75 provides solid support for the filler 2. Because of the utilization of the resiliently compressible gasket 63, it is not necessary to provide a resilient support between the tubulation protector 15 and the bottom wall 74.

The illustrated jacket 72 is provided with an upper annular portion or collar 76 which is removably mounted on the upper end of the side wall 73. Thus, the illustrated collar 76 has a threaded lower portion 77 which is adapted to be screwed into a threaded ring 78 permanently secured to the upper end of the side wall 73. If desired, the threaded member 78 may be formed integrally with the side wall 73.

The collar 76 has an intermediate portion 79 which is formed with threads 80 adapted to be engaged by the internal threads 23 on the cup 21. Thus, the cup 21 may be screwed onto the collar 76.

Above the intermediate portion 79, the collar 76 has an inwardly and upwardly tapering portion 81 disposed around the neck 7 of the filler. A reduced, generally cylindrical portion 82 is formed at the upper end of the tapering portion 81. Threads 83 may be formed in the cylindrical portion 82 for engagement by the threads 34 on the closure 25.

At its upper end, the collar 76 may be formed with an outwardly and upwardly projecting annular pouring lip 84 which overhangs an annular groove 85 formed in the collar below the lip 84. An annular flange 86 projects inwardly and downwardly from the pouring lip 84 so as to overhang the rounded upper end wall 9 of the filler 2.

It will be seen that the gasket 63 is disposed between the upper end portion of the collar 76 and the upper end of the filler 2. The upper sealing lip 42 is adapted to engage the under side of the flange 86 on the collar 76, while the lower sealing lip 43 is adapted to engage the rounded upper wall 9 on the filler 2. Thus, the gasket insures a perfect seal between the collar and the upper end of the filler.

It will be seen that the downwardly projecting flange 64 on the gasket 63 is received around the upper end of the filler 2, while the serrated upper flange 65 is compressed under the pouring lip 84 and the flange 86. The serrations 66 are compressed or collapsed by the flange 86 on the collar so as to insure that the filler 2 will be pressed securely downwardly against the bottom wall 74 of the protective jacket 72. The compressibility of the serrations is sufficient to compensate for any manufacturing variations in the length of the filler 2.

The saw-toothed shape of the serrations 66 makes it easy to screw the collar 76 onto the side side wall 73 of the vacuum bottle. During this operation, the direction of movement of the collar 76 is the same as the direction in which the sloping sides 67 of the serrations are slanted. Thus, the flange 86 on the collar is easily able to flex or compress the serrations 66 downwardly.

The saw tooth-shaped serrations act in the manner of barbs to resist accidental unscrewing movement of the collar. Thus, the collar tends to remain tightly mounted on the vacuum bottle once it has been screwed down during the process of assembly.

In this case, the notches 70 between the serrations 66 have lower portions 87 which extend downwardly or are recessed into the body of the gasket. Thus, the compressibility of the serrations is increased. The serrations 66 are made relatively thin so as to fit into the narrow space under the flange 86 on the collar 76.

The compressible gasket constructions of the present invention obviate any need for a resilient supporting member or cushion between the lower end of the filler and the bottom of the jacket. The resilient downward pressure of the compressible gasket protects the filler against breakage by preventing any looseness from existing between the filler and the jacket. By eliminating any need for a cushion at the lower end of the filler, the present compressible gasket reduces the over-all cost of the vacuum bottle. Moreover, the firm support for the filler prevents the filler from being pushed downwardly away from the gasket when the closure is tightened down. Thus, a good seal is maintained at all times between the filler and the gasket.

Various modifications, alternative constructions and equivalents may be employed without departing from the true spirit and scope of the invention, as exemplified in the foregoing description and defined in the following claims.

I claim:

1. For use in a thermos bottle between a glass vacuum-insulated filler, having an upper end portion with a mouth therein, and a protective jacket around said filler and having an inwardly projecting annular flange on the upper end of said jacket: an annular gasket of rubbery material and adapted to be compressed between the upper end portion of said filler and said flange on said jacket, said gasket comprising an inner annular portion with a downwardly projecting flexible sealing lip for engaging the upper end of said filler and an upwardly projecting flexible sealing lip for engaging said flange on said jacket, and an outer annular portion on said gasket and having a plurality of upwardly projecting teeth spaced around said gasket and adapted to be engaged by said flange, said teeth having notches therebetween, said teeth and said notches rendering said gasket compressible between said flange and said upper end portion of said filler to provide for resilient downward force on said filler.

2. For use in a thermos bottle between a glass vacuum-insulated filler, having an upper end portion with a mouth therein, and a protective jacket around said filler and having an inwardly projecting annular flange on the upper end of said jacket: an annular gasket of rubbery material and adapted to be compressed between the upper end portion of said filler and said flange on said jacket, said gasket comprising an inner sealing portion engageable with the upper end portion on said filler and an outer compressible portion disposed outwardly of said sealing portion and having a plurality of upwardly projecting teeth spaced around said gasket and adapted to be engaged by said flange, said teeth having notches therebetween, said teeth and said notches rendering said gasket compressible by said flange to provide for resilient downward force on said filler.

3. For use in a thermos bottle between a glass vacuum-insulated filler, having an upper end portion with a mouth therein, and a protective jacket around said filler and having an inwardly projecting annular flange on the upper end of said jacket: an annular gasket of rubbery material and adapted to be compressed between the upper end portion of said filler and said flange on said jacket, said gasket comprising an annular sealing portion adapted to engage said upper end portion of said filler, and a compressible portion having a series of upwardly projecting teeth thereon with notches therebetween, said teeth being adapted to be engaged by said flange, said teeth and said notches imparting compressibility to said gasket to provide for resilient downward force on said filler.

4. The gasket of claim 3, in which said teeth are saw-toothed in form.

5. In a thermos bottle, the combination comprising a vacuum-insulated filler having an upper end portion with a mouth therein, a protective jacket disposed around said filler and having a plurality of portions formed with mating screw threads for assembly and disassembly of said jacket, substantially unyielding means on the lower end of said jacket for supporting the lower end of said filler, an inwardly projecting annular flange on the upper end of said jacket, and a soft resilient rubbery gasket compressed between said flange and said upper end portion of said filler, said gasket having a downwardly projecting flexible sealing lip for engaging the upper end portion of said filler and an upwardly projecting flexible sealing lip for engaging said flange on said jacket, and an outer annular portion on said gasket and having a plurality of upwardly projecting teeth spaced around said gasket and engaging said flange, said teeth having notches therebetween and imparting compressibility to said gasket to provide for resilient downward force on said filler.

6. In a thermos bottle, the combination comprising a vaccum-insulated filler having an upper end portion with a mouth therein, a protective jacket disposed around said filler and having a plurality of portions formed with mating screw threads for assembly and disassembly of said jacket, substantially unyielding means on the lower end of said jacket for supporting the lower end of said filler, an inwardly projecting annular flange on the upper end of said jacket, and a soft resilient rubbery gasket compressed between said flange and said upper end portion of said filler, said gasket having an annular sealing portion engaging said upper end portion of said filler, and a compressible portion disposed outwardly of said sealing portion and having a series of upwardly projecting teeth spaced around said gasket and engaging said flange, said teeth having notches therebetween and imparting compressibility to said gasket to provide for resilient downward force on said filler.

References Cited in the file of this patent

UNITED STATES PATENTS

| | | |
|---|---|---|
| 2,997,200 | Grannini et al. | Aug. 22, 1961 |
| 3,028,984 | Bramming | Apr. 10, 1962 |

FOREIGN PATENTS

| | | |
|---|---|---|
| 1,218,437 | France | Dec. 21, 1959 |